July 5, 1927.
J. F. ROTTGER
1,634,518
AUTOMATIC SIPHON
Filed June 2, 1926
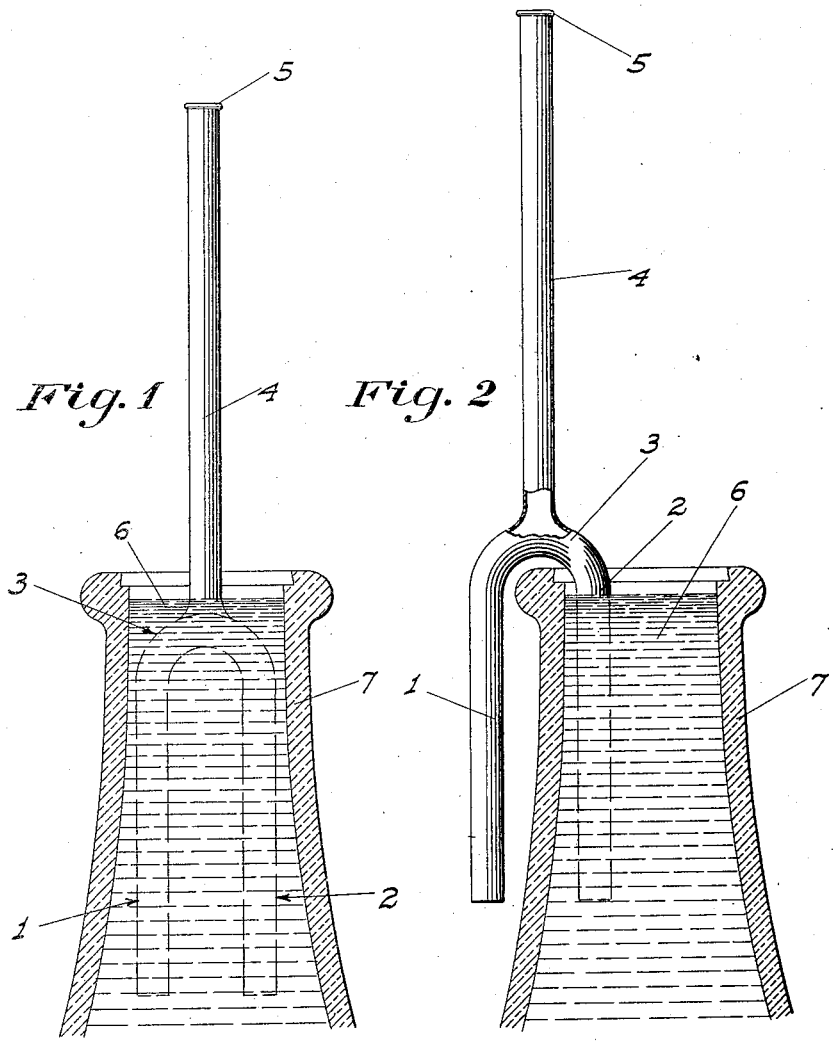
INVENTOR
J. F. Rottger
BY
ATTORNEY Patented July 5, 1927.

1,634,518

UNITED STATES PATENT OFFICE.

JOHN F. ROTTGER, OF MODESTO, CALIFORNIA.

AUTOMATIC SIPHON.

Application filed June 2, 1926. Serial No. 113,130.

This invention relates to improvements in siphoning devices, my principal object being to provide a device of this character particularly intended to enable the cream collecting at the top of the milk bottle, to be easily removed without tipping the bottle and without any of the milk being removed along with the cream.

A further object of the invention is to provide a device for the purpose of such a nature that it can be used in connection with any standard milk bottle, whether of a pint or quart size.

Still another object is to provide a device of this character which will last indefinitely, and which can be easily kept in a clean and sanitary condition, as is necessary with devices of this character.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a fragmentary sectional elevation of a milk bottle adjacent the neck thereof showing my automatic siphon as applied thereto in its initial position.

Fig. 2 is a similar view showing the siphon device arranged in connection with the bottle in its siphoning position.

Fig. 3 is an enlarged fragmentary section showing an automatic type of valve which may be used in connection with the siphon.

Referring now more particularly to the characters of reference on the drawings, the numerals 1 and 2 denote a pair of parallel tubes of the same length, open on their lower ends and connected at their upper ends by a cross member 3, the members 1, 2 and 3 being preferably formed of a single piece of tubing bent to the proper shape. From the cross member 3 a vertical rigid extension 4 projects upwardly a certain distance. This member 4 is open on both ends, communicating with the member 3 and tubes at its lower end and with the atmosphere at its upper end. The member 4 is of sufficient length to serve as a handle for grasping and manipulating the device, and its free end is preferably provided with a smooth rounded beading as at 5 so that a thumb or finger placed thereover will make an efficient air seal.

In utilizing the device the user grasps the handle 4 with his thumb above the top of the same and inserts the tubes 1 and 2 into the cream 6 in the bottle 7 until the tubes and the member 3 are completely submerged in the cream, as shown in Fig. 1. The operator then seals the top of the member 4 by pressing his thumb firmly onto the beading 5. This will of course prevent the passage of air downward through the member 4, so that the liquid in the tubes 1 and 2, drawn into the same by the downward movement of said tubes, cannot escape. The operator then removes the tubes 1 and 2 from the liquid, maintaining the top of the member 4 sealed. The siphon is then lowered so that the two tubes straddle the neck of the bottle, so that one tube is inside the bottle and the other is on the outside of the same, as shown in Fig. 2. A siphoning action will then immediately take place through the tubes from the one inside the bottle into and from the tube on the outside of the bottle, as will be evident. This siphoning action will take place continuously, or until the thumb is removed from the member 4, until the level of the liquid in the bottle has dropped to a point substantially equal to the level of the bottom of the tubes.

It will therefore be evident that an amount of cream in the bottle can be withdrawn without disturbing the milk below, equal substantially to the length of the tubes 1 and 2, which are designed so as to be proportionate to the amount of cream usually collected on the top of bottled milk. Should the cream in the bottle be of a lesser depth than the length of the tubes it is only necessary, after first completely immersing the tubes, to reset them so that the bottom of the tube in the liquid does not extend below the cream line; the tubes in this case being maintained suspended from the top of the bottle rather than being allowed to rest on the top as would be the case if the cream were of sufficient depth to justify this latter positioning.

If desired, the member 4$^a$ may be provided with an upwardly opening check valve such as a ball 8, which would function to rise and permit the escape of air from the member 4 when the tubes were being depressed into the liquid, and would lower and seat itself as soon as the tubes were drawn out of the liquid. This latter form, however, I do not feel is really as good as the thumb seal, since there is a possibility that the ball would not be absolutely airtight, and further it would be harder to clean the device than is the case with the first named construction, which is freely open from end to end.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A siphon comprising an inverted U-shaped tube whose legs are of equal length and open on their lower ends, said legs being spaced apart a distance sufficient to enable both to be inserted simultaneously in the neck of a milk bottle, and an air passage member also serving as a handle, projecting upwardly from the top of the tube member.

In testimony whereof I affix my signature.

JOHN F. ROTTGER.